(12) United States Patent
Su et al.

(10) Patent No.: US 12,393,972 B2
(45) Date of Patent: Aug. 19, 2025

(54) METHOD, SYSTEM, AND MEDIUM FOR ATTRIBUTE-BASED ITEM RANKING DURING A WEB SESSION

(71) Applicant: Etsy, Inc., Brooklyn, NY (US)

(72) Inventors: Congzhe Su, Irvine, CA (US); Amey Barapatre, Bellevue, WA (US); Xiaoting Zhao, Queens, NY (US); Diane Hu, Brooklyn, NY (US); Xu Liu, Bellevue, WA (US)

(73) Assignee: Etsy, Inc., Brooklyn, NY (US)

( * ) Notice: Subject to any disclaimer, the term of this patent is extended or adjusted under 35 U.S.C. 154(b) by 53 days.

(21) Appl. No.: 17/682,366

(22) Filed: Feb. 28, 2022

(65) Prior Publication Data
US 2022/0277375 A1    Sep. 1, 2022

Related U.S. Application Data

(60) Provisional application No. 63/154,790, filed on Feb. 28, 2021.

(51) Int. Cl.
G06Q 30/0601        (2023.01)

(52) U.S. Cl.
CPC ..... G06Q 30/0631 (2013.01); G06Q 30/0627 (2013.01); G06Q 30/0641 (2013.01)

(58) Field of Classification Search
CPC ........... G06Q 30/0246; G06Q 30/0631; G06Q 30/0269; G06Q 30/0201; G06Q 30/0255; G06Q 30/06; G06Q 30/0627; G06Q 30/0641; G06Q 30/0601–0645
USPC ........................................ 705/26.7, 26.1–27.2
See application file for complete search history.

(56) References Cited

U.S. PATENT DOCUMENTS

| | | | |
|---|---|---|---|
| 10,497,012 B1* | 12/2019 | Majumder | G06N 7/01 |
| 11,551,096 B1* | 1/2023 | Mishra | G06N 3/044 |
| 2015/0149261 A1* | 5/2015 | Walkingshaw | G06Q 10/06395 |
| | | | 705/7.41 |
| 2017/0098236 A1* | 4/2017 | Lee | G06Q 10/067 |

(Continued)

OTHER PUBLICATIONS

Guanjie Zheng, Fuzheng Zhang, Zihan Zheng, Yang Xiang, Nicholas Jing Yuan, Xing Xie, Zhenhui Li, "DRN: A Deep Reinforcement Learning Framework for News Recommendation," 2018, International World Wide Web Conference Committee, Creative Commons CC BY 4.0 License, 167-176 (Year: 2018).*

(Continued)

*Primary Examiner* — Marissa Thein
*Assistant Examiner* — Anna Mae Mitros
(74) *Attorney, Agent, or Firm* — Fish & Richardson P.C.

(57) ABSTRACT

Methods, systems, and apparatuses, including computer programs encoded on a computer storage medium, that rank items based on user interactions within the same web session. The method includes: providing a first content page for display on a client device; receiving a set of user interactions with one or more items of the first plurality of items; determining an affinity score representing a user interest in the attribute based on the set of user interactions; updating an attribute repository storing a second plurality of attributes and corresponding current affinity scores; identifying a second plurality of items and a corresponding third plurality of attributes; ranking the second plurality of items; and providing a second content page for display on the client device.

17 Claims, 6 Drawing Sheets

(56) References Cited

U.S. PATENT DOCUMENTS

| | | | |
|---|---|---|---|
| 2018/0246974 A1* | 8/2018 | Shukla | G06F 16/9535 |
| 2019/0130444 A1* | 5/2019 | Fei | G06F 16/437 |
| 2019/0213608 A1* | 7/2019 | Ouyang | G06Q 30/0201 |
| 2019/0295124 A1* | 9/2019 | Ramesh | G06N 3/084 |
| 2021/0042796 A1* | 2/2021 | Khoury | G06Q 10/103 |
| 2021/0241349 A1* | 8/2021 | Mantha | G06Q 30/0631 |
| 2022/0245162 A1* | 8/2022 | Wang | G06F 16/24578 |

OTHER PUBLICATIONS

Agrawal et al., "Analysis of thompson sampling for the multi-armed bandit problem," In Proceedings of 25th Conference on Learning Theory, Edinburgh, Scotland, Jun. 25-27, 2012; PMLR, 2012, 23:39.1-39.26.

Auer et al., "Finite-time Analysis of the Multiarmed Bandit Problem," Machine Learning, May 2002, 47:235-256.

Auer et al., "The Nonstochastic Multiarmed Bandit Problem," SIAM Journal on Computing, Jan. 2003, 32(1):48-77.

Bai et al., "An Attribute-Aware Neural Attentive Model for Next Basket Recommendation," Short Paper in The 41st International ACM SIGIR Conference on Research & Development in Information Retrieval, Ann Arbour, MI, Jul. 8-12, 2018, pp. 1201-1204.

Blei et al., "Latent Dirichlet Allocation," The Journal of Machine Learning Research, Mar. 2003, 3:993-1022.

Burges et al., "Learning to rank with nonsmooth cost function," In Proceedings of Neural Information Processing Systems 2006, Vancoover, B.C., Canada, Dec. 4-9, 2006; Advances in Neural Information Processing Systems 19, Dec. 2006, 8 pages.

Chapelle et al., "An Empirical Evaluation of Thompson Sampling," In Proceedings of Neural Information Processing Systems 2011, Granada, Spain, Dec. 12-15, 2011; Advances in Neural Information Processing Systems 24, Dec. 2011, 9 pages.

Guo et al., "Debiasing Grid-based Product Search in E-commerce," In Proceedings of the 26th ACM SIGKDD International Conference on Knowledge Discovery & Data Mining, Virtual Event, USA, Aug. 23-27, 2020, pp. 2852-2860.

Guo et al., "Streaming Session-Based Recommendation," In Proceedings of the 25th ACM SIGKDD International Conference on Knowledge Discovery and Data Mining, Anchorage, AK, Aug. 4-8, 2019, pp. 1569-1577.

Haldar et al., "Improving Deep Learning for Airbnb Search," In Proceedings of the 26th ACM SIGKDD International Conference on Knowledge Discovery & Data Mining, Virtual Event, USA, Aug. 23-27, 2020, pp. 2822-2830.

Hidasi et al., "Session-based Recommendations with Recurrent Neural Networks," In Proceedings of ICLR 2016, San Juan, PR, May 2-4, 2016; arXiv:1511.06939, Mar. 2016, 10 pages.

Hu et al., "Diversifying Personalized Recommendation with User-Session Context," In Proceedings of the 26th International Joint Conference on Artificial Intelligence, Melbourne, Australia, Aug. 19-25, 2017, pp. 1858-1864.

Hu et al., "Reinforcement Learning to Rank in E-Commerce Search Engine: Formalization, Analysis, and Application," In Proceedings of the 24th ACM SIGKDD International Conference on Knowledge Discovery and Data Mining, London, UK, Aug. 19-23, 2018, pp. 368-377.

Huang et al., "Embedding-Based Retrieval in Facebook Search," In Proceedings of the 26th ACM SIGKDD International Conference on Knowledge Discovery & Data Mining, Virtual Event, USA, Aug. 23-27, 2020, pp. 2553-2561.

Li et al., "Context-Aware Bandits," arxiv.org, Feb. 2017, arXiv:1510.03164, 18 pages.

Li et al., "Contextual Combinatorial Cascading Bandits," In Proceedings of the 33rd International Conference on International Conference on Machine Learning, New York, NY, Jun. 19-24, 2016; ICML '16, Jun. 2016, 48:1245-1253.

Li et al., "Learning from History and Present: Next-Item Recommendation via Discriminatively Exploiting User Behaviors," In Proceedings of the 24th ACM SIGKDD International Conference on Knowledge Discovery and Data Mining, London, UK, Aug. 19-23, 2018, pp. 1734-1743.

Liu et al., "Interpretable Attribute-based Action-aware Bandits for Within-Session Personalization in E-commerce," In Proceedings of KME Commerce Workshop held at WWW '21, Ljubljana, Slovenia, Apr. 19-23, 2021, 8 pages.

Liu et al., "STAMP: Short-Term Attention/Memory Priority Model for Session-Based Recommendation," In Proceedings of the 24th ACM SIGKDD International Conference on Knowledge Discovery and Data Mining, London, UK, Aug. 19-23, 2018, pp. 1734-1743.

Loyola et al., "Modeling User Session and Intent with an Attention-Based Encoder- Decoder Architecture," In Proceedings of the Eleventh ACM Conference on Recommender Systems, Como, Italy, Aug. 27-31, 2017; RecSys '17, Aug. 2017, pp. 147-151.

Nigam et al., "Semantic Product Search," In Proceedings of the 25th ACM SIGKDD International Conference on Knowledge Discovery & Data Mining, Anchorage, AK, Aug. 4-8, 2019; KDD '19, Jul. 2019, pp. 2876-2885.

Pobrotyn et al., "Context-Aware Learning to Rank with Self-Attention," In Proceedings of ACM SIGIR Workshop on eCommerce, Virtual Event, China, Jul. 30, 2020; arXiv:2005.10084, May 2020, 8 pages.

Qiu et al., "Rethinking the Item Order in Session-Based Recommendation with Graph Neural Networks," In Proceedings of the 28th ACM International Conference on Information and Knowledge Management, Beijing, China, Nov. 3-7, 2019; CIKM '19, Nov. 2019, pp. 579-588.

Quadrana et al., "Personalizing Session-Based Recommendations with Hierarchical Recurrent Neural Networks," In Proceedings of the Eleventh ACM Conference on Recommender Systems, Como, Italy, Aug. 27-31, 2017; RecSys '17, Aug. 2017, pp. 130-137.

Sanz-Cruzado et al., "A Simple Multi-Armed Nearest-Neighbor Bandit for Interactive Recommendation," In Proceedings of the 13th ACM Conference on Recommender Systems, New York, NY, Sep. 16-20, 2019, pp. 358-362.

Tan et al., "Fast Item Ranking under Neural Network Based Measures," In Proceedings of the 13th International Conference on Web Search and Data Mining, Feb. 3-7, 2020, pp. 591-599.

Tan et al., "Improved Recurrent Neural Networks for Session-Based Recommendations," In Proceedings of the 1st Workshop on Deep Learning for Recommender Systems, Boston, MA, Sep. 15, 2016, pp. 17-22.

Wang et al., "A theoretical analysis of NDCG ranking measures," In Proceedings of the 26th annual Conference on Learning Theory, Princeton, NJ, Jun. 12-14, 2013; JMLR, 2013, 30:25-54.

Wang et al., "Online Interactive Collaborative Filtering Using Multi-Armed Bandit with Dependent Arms," IEEE Transactions on Knowledge and Data Engineering, Aug. 2019, 31(8):1569-1580.

Wu et al., "Adapting boosting for information retrieval measures," Information Retrieval, Jun. 2010, 13(3):254-270.

Wu et al., "Turning clicks into purchases: Revenue optimization for product search in e-commerce," In Proceedings of the 41st International ACM SIGIR Conference on Research & Development in Information Retrieval, New York, NY, Jul. 8-12, 2018, pp. 365-374.

Yan et al., "A Practical Deep Online Ranking System in E-commerce Recommendation," In Proceedings of ECML PKDD 2018, Dublin, Ireland, Sep. 10-14, 2018, pp. 186-201.

Yu et al., "A Dynamic Recurrent Model for Next Basket Recommendation," In Proceedings of the 39th International ACM SIGIR Conference on Research and Development in Information Retrieval, Pisa, Italy, Jul. 17-12, 2016, pp. 729-732.

Zhang et al., "Deep Learning Based Recommender System: A Survey and New Perspectives," ACM Comput. Surv., Jan. 2019, 52(1):5, 38 pages.

Zhao et al., "Maximizing Cumulative User Engagement in Sequential Recommendation: An Online Optimization Perspective," In Proceedings of the 26th ACM SIGKDD International Conference on Knowledge Discovery & Data Mining, Virtual Event, USA, Aug. 23-27, 2020, pp. 2784-2792.

Zhao et al., "The Difference Between a Click and a Cart-Add: Learning Interaction-Specific Embeddings," In Companion Proceed-

(56) References Cited

OTHER PUBLICATIONS ings of the Web Conference 2020, Taipei, Taiwan, Apr. 20-24, 2020, pp. 454-460.

\* cited by examiner

| Timestamp | Query | Query Taxonomy | User Interaction | Engaged Attributes |
|---|---|---|---|---|
| 0 | "flower girl basket" | Paper and party supplies | Browsing | NA |
| 1-4 | "flower girl basket wedding" | Paper and party supplies | Click | "Prime Color: White," "Occasion: Wedding", "Holiday: Christmas", "Wedding theme: Beach & tropical", "Craft type: Floral arranging" |
| 5-9 | "flower girl basket beach wedding" | Paper and party supplies | Click | "Prime Color: Blue," "Occasion: Wedding", "Holiday: Christmas", "Wedding theme: Beach & tropical", "Secondary Color: White," "Craft type: Floral arranging" |
| 10-11 | "two flower girl and one pillow" | Paper and party supplies | Browsing | NA |
| 12-15 | "hat for beach wedding" | Clothing: Women clothing | Add to Cart | "Prime Color: Blue," "Occasion: Wedding" |
| 16-22 | "turquoise petals" | Accessories | Click | "Prime Color: Blue," "Occasion: Bridal shower", "Wedding theme: Fairytale & princess" |
| 23 | "bride hair decoration beach theme" | Clothing: Women clothing | Browsing | NA |
| 24 | "turquoise petals" | Accessories | Purchase | "Prime Color: Blue," "Occasion: Bridal shower", "Wedding theme: Fairytale & princess" |

Figure 3

METHOD, SYSTEM, AND MEDIUM FOR ATTRIBUTE-BASED ITEM RANKING DURING A WEB SESSION

CROSS-REFERENCE TO RELATED APPLICATIONS

This application claims the benefit under 35 U.S.C. § 119(e) of U.S. Provisional Patent Application No. 63/154,790, entitled "INTERPRETABLE ATTRIBUTE-BASED ACTION-AWARE BANDITS FOR WITHIN-SESSION PERSONALIZATION IN E-COMMERCE," filed Feb. 28, 2021. The disclosure of the foregoing application is incorporated herein by reference in its entirety for all purposes.

BACKGROUND

This specification relates to data processing and utilizing attribute-based ranking to rank items on an exchange platform during a web session, based on user interactions with other items provided for display during the same web session.

An exchange platform enables the exchange of goods, content, and services between users and providers. Providers can list or provide their goods, contents, and services on the exchange platform, and users obtain the goods, content, and services from the providers via the exchange platform.

A user can provide one or more search queries to the exchange platform and receive one or more web pages listing all the goods, content, and services matching the search queries. The exchange platform can utilize a ranking system, by which the goods, content, and services are ranked in descending order of relevance to the user. However, existing ranking systems are often trained with billions of historical shopping data that may span over the course of months or years, and thus cannot react quickly enough to the user's changing preference within a web session on the exchange platform.

SUMMARY

In general, one innovative aspect of the subject matter described in this specification can be embodied in methods including the following operations: providing, by a processor and during a user web session, a first content page for display on a client device, wherein the first content page includes a first plurality of items, the first plurality of items corresponds to a first plurality of attributes, and each item in the first plurality of items corresponds to a respective set of attributes; receiving, during the user web session and by the processor, a set of user interactions with one or more items of the first plurality of items; determining, by the processor and for each attribute in the first plurality of attributes, an affinity score representing a user interest in the attribute based on the set of user interactions; updating, based on the determined affinity scores for the first plurality of attributes, an attribute repository storing a second plurality of attributes and corresponding current affinity scores, wherein the first plurality of attributes is a subset of the second plurality of attributes; identifying a second plurality of items and a corresponding third plurality of attributes; ranking, by the processor and based on the current affinity scores corresponding to the third plurality of attributes stored in the attribute repository, the second plurality of items; and providing, by the processor and during the web session, a second content page for display on the client device, wherein the second content page includes the ranked second plurality of items.

These and other embodiments can each optionally include one or more of the following features.

In some implementations, determining the affinity score representing a user's interest includes determining a Beta distribution for each attribute in the first plurality of attributes.

In some implementations, one parameter of the Beta distribution is associated with a subset of attributes in the first plurality of attributes that receives the set of user interactions, and another parameter of the Beta distribution is associated with the remaining attributes in the first plurality of attributes that receive no positive user interactions.

In some implementations, the set of user interactions includes one or more of: browsing the one or more items of the first plurality of items, clicking the one or more items of the first plurality of items, adding the one or more items of the first plurality of items to a shopping cart, or purchasing the one or more of the first plurality of items.

In some implementations, determining the affinity score representing the user's interest includes assigning a different weight to each of the clicking the one or more of the first plurality of items, the adding the one or more of the first plurality of items to a shopping cart, and the purchasing the one or more of the first plurality of items.

In some implementations, determining the affinity score representing the user's interest includes assigning a same weight to each of the clicking the one or more of the first plurality of items, the adding the one or more of the first plurality of items to a shopping cart, and the purchasing the one or more of the first plurality of items.

In some implementations, the first plurality of attributes includes at least one of color, size, shape, or material.

In some implementations, ranking the second plurality of items includes ranking, using a multi-armed bandit (MAB), the second plurality of items, wherein each arm of the MAB represents one of the third plurality of attributes.

In some implementations, ranking the second plurality of items includes: generating, based on the affinity scores corresponding to each attribute in the third plurality of attributes, a score for each item in the second plurality of items; and ranking, based on the generated scores, the second plurality of items.

Other embodiments of the above-described aspects can include corresponding systems, devices, apparatuses, and computer programs configured to perform the actions of the methods. The computer programs (e.g., instructions) can be encoded on computer storage devices.

Particular embodiments of the subject matter described in this specification can be implemented to realize one or more of the following advantages. For example, the innovations described in this specification can respond quickly to a changing preference of a user within the same web session, and thus improve ranking performance of items over time within the same shopping session. Conventional techniques leverage a two-stage ranker that is trained on billions of historical data points that may span over the course of months or years and thus cannot react quickly enough to the user's changing preference within the same web session. In contrast, the attribute-based ranker described herein extracts a descriptive set of attributes (such as its color, texture, material, and shape) from each item and learns which attributes the user likes or dislikes, forming an interpretable user preference profile that is used to rank items in real-time in a personalized manner. Thus, ranking performance can be improved over time within the same web session.

The attribute-based ranker described in this specification utilizes a multi-arm bandit (MAB), wherein each arm in the MAB represents an attribute. Unlike conventional MAB implementations that assign each arm of the MAB to a particular item or item category, the techniques described herein determine a descriptive set of attributes (such as its color, texture, material, and shape) from each item, and assign each arm of the MAB to a particular attribute. This significantly reduces the complexity space compared with modeling preferences at an item level, while offering more fine-grained personalization compared with modeling preferences at an item category level. Thus, the attribute-based modeling described herein achieves significant computing resource efficiencies because of reducing processing complexity by operating on a finite number of attributes that are shared among a large number of unique items (as compared to operating on the large number of unique items). Moreover, the finite number of attributes result in a light-weighted overall system, which does not require significant computing resources for its processing. Thus, the attribute-based ranker can be easily scalable to provide ranking on a large set of items without adding burden on latency.

Moreover, the improved personalization and responsive results stemming from the techniques described herein achieve additional computing resource savings, because the user does not have to iteratively submit search queries and retrieve search results until the desired item is identified. In contrast, the techniques described herein enable identification of user interest in particular attributes based on user interactions with items during the web session, thereby allowing tailoring of subsequent results or items (which might have the attributes to which the user showed affinity in the same web session).

The attribute-based ranker described in this specification can be used as a stand-alone ranker in the exchange platform. Alternatively, the attribute-based ranker can be deployed in combination with a conventional two-stage ranker, which is trained with long-term data aggregated over billions of user and item preferences. Thus, the exchange platform can rank items in real-time within the same web session, in addition to ranking items based on long-term user historical data. As such, the techniques described herein enable provision of more responsive/relevant search results (leveraging the strength of two-stage rankers), while allowing for real-time personalization of the search results during a web session based on user indicated interest in particular attributes during the same web session (thus leveraging the in-session attribute-based ranking techniques described herein).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a table that illustrates attributes of example items related to a wedding.

Like reference numbers and designations in the various drawings indicate like elements.

DETAILED DESCRIPTION

Figure 1:
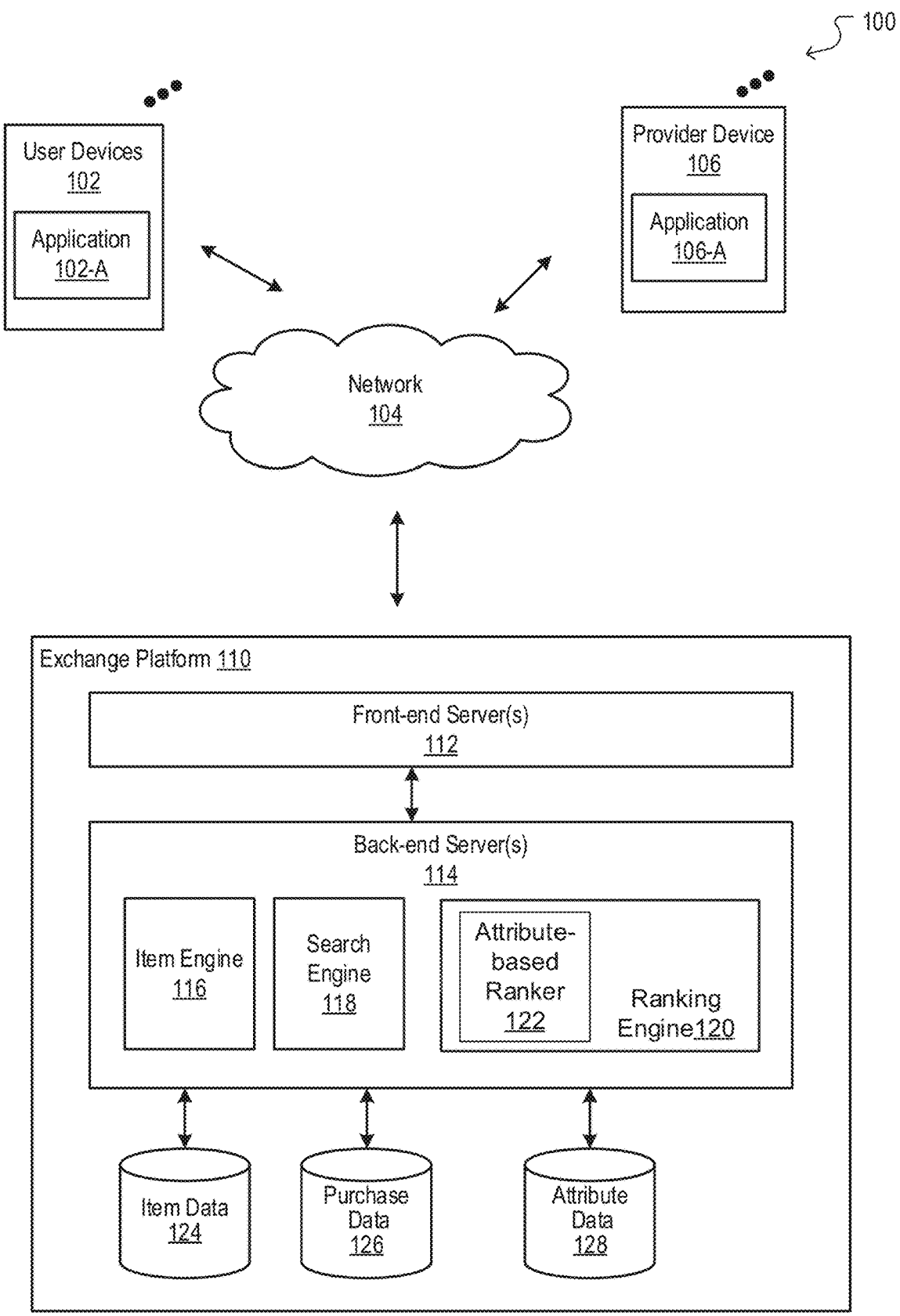
FIG. 1 is a block diagram of an example environment in which an exchange platform facilitates an exchange of items between providers and users.

This disclosure relates to computer-implemented methods and systems that facilitate providing a ranked list of items based on user preference within a user web session (e.g., a web shopping session). The techniques and methods described in this specification are explained with reference to an example production environment of an E-Commerce or exchange platform/website that provides a platform for sellers who use the platform as a tool to sell the items and for buyers who use the platform to search for and purchase items sold by the sellers on the platform. However, one skilled in the art will appreciate that the techniques described in this specification are applicable in any number of applications and systems (e.g., search applications, systems for recommending content or items for provision to users, etc.). For brevity and ease of explanation, the following descriptions apply the techniques described in this specification with reference to an example exchange platform.

Providers (e.g., sellers) provide items (e.g., goods, services, and content) that users (e.g., buyers) of the exchange platform (e.g., registered members of the platform or guests of the platform) can obtain (e.g., interact with, purchase, etc.). Some E-commerce platforms provide a website with search functionality that enables a user to input and execute a search query and retrieve a first web page listing items matching the search query. Each item on the web page (and in general) has a set of attributes, which can include, e.g., common attributes such as color, size, shape, material, etc. or/and customized attributes such as craft type, occasion, wedding theme, etc. The user may interact with these items, for example, browse these items without further actions, click one or more items to get more information related to these items, add one or more items to a shopping cart, or purchase one or more items.

As described further in this specification, based on the user's interactions with one or more items, the exchange platform can provide a second web page listing new items within the same web session (e.g., in response to another search query input by the user or when the user desires to navigate to a second page with an additional item listing for the same search query). The techniques described herein utilize the interactions with one or more items to determine user interest or preference in a set of attributes corresponding to the items with which the user interacted. Such user interest or preference is quantified using an affinity score (e.g., a score ranging from zero to one), where the affinity score for an attribute is directly correlated with the number of interactions with items including that attribute. In this manner, the affinity score is computed for each attribute of items on the first web page, and the affinity score for each attribute (represented by $\theta_{atr}$) denotes the probability that the user is interested in the attribute.

In some implementations, a multi-armed bandit (MAB) is used for the above-summarized ranking, and each arm of the MAB can represent one attribute. For example, one arm of MAB represents "Color: White", one arm of MAB represents "Occasion: Wedding", one arm of MAB represents "Holiday: Christmas", one arm of MAB represents "Material: Diamond", one arm of MAB represents "Size: Large", one arm of MAB represents "Shape: Oval", etc.

In some implementations, user interactions, e.g., click, add-to-chart, or purchase, can be assigned with the same weight. Alternatively, click, add-to-chart, or purchase can be assigned with a different weight. For example, the weight of click is 0.1, the weight of add-to-chart is 0.2, and the weight of purchase is 0.3. Assigning different weights to different interactions enables the methods and systems described herein to emphasize or give more significance to user interactions that indicate higher interest in an attribute (e.g., a user decision to obtain an item) relative to other interactions (e.g., a user click on an item's listing). The user's affinity scores for the different attributes can be used to update an attribute repository that maintains the complete listing of attributes and corresponding current affinity scores for those attributes.

In some implementations, the long-term user historical data can be used to estimate weights of the user interactions. Additionally, user preferences (i.e., click-through rate, add-to-cart-rate, purchase-rate, favorite-rate) on attributes for each user can be estimated through the historical dataset. These estimated values can be grouped for each (Attribute, User Interaction Type) pair, and a Beta-distribution is performed to derive $\alpha_{atr_h}$, $\beta_{atr_h}$ for each (Attribute, User Interaction Type) pair.

In some implementations, other initialization approaches (e.g., "Uniform" approach, "Random" approach, etc.) can be applied to initialize the attribute repository (e.g., the attribute data storage device 128). "Uniform" approach is a type of randomization. In the continuous Uniform distribution, abbreviated U(a, b), an arbitrary outcome is drawn with the following probability density function and lies within the range [a, b]:

$$f(x) = \begin{cases} \frac{1}{b-a} & \text{for } a \le x \le b, \\ 0 & \text{for } x < a \text{ or } x > b \end{cases}$$

"Random" approach describes how the probabilities are drawn over the values of the random variable, with its associated probabilities of finding the value defined by a probability mass function.

During the same web session, a user may submit a new query to obtain new item listings or request additional item listings for a previously submitted query. In either case, the techniques described herein obtain another listing of items (which includes its own set of attributes). This listing of items is then ranked based on the current affinity scores corresponding to these items' attributes. In this manner, a user's interest or affinity with attributes is used to rank items that are provided to the user during the same web session. This is illustrated by the below example (and described in greater detail with reference to FIGS. 1-6).

For example, when interacting with an example exchange platform website, a user submits a search query "ring" to the exchange platform and retrieves a first web page listing a plurality of rings. The user clicks on listings for two gemstone rings, and the attributes of the clicked gemstone rings are "Crystal", "Gemstone", "Ruby", and "Rose Gold." The exchange platform can then, within the same web session, provide a second web page listing a plurality of new rings, wherein the new rings having the attributes "Crystal", "Gemstone", "Ruby", or/and "Rose Gold" rank higher than other rings with different attributes.

These and additional features are described in more detail below.

FIG. 1 is a block diagram of an example environment 100 in which an exchange platform facilitates an exchange of items (such as goods, services, or content) between providers and users. The example environment 100 includes a network 104, such as a local area network (LAN), a wide area network (WAN), the Internet, or a combination thereof. The network 104 connects one or more user devices 102, one or more provider devices 106, an exchange platform 110, and one or more external sources 108.

User device 102 and provider device 106 are electronic devices that are capable of requesting and receiving items over the network 104. Examples of such devices include, among others, personal computers, mobile communication devices, digital assistant devices, and other devices that can send and receive data over the network 104.

The exchange platform 110 can be a computing platform that is operated and maintained by an exchange service provider. The exchange platform 110 enables providers to list their items on the exchange platform 110 and enables users to obtain the items listed on the exchange platform 110. As depicted in the block diagram of FIG. 1, the exchange platform 110 is depicted as a single block with various sub-blocks. However, while the exchange platform 110 could be a single device or single set of devices, this specification contemplates that the exchange platform 110 could also be a group of devices, or even multiple different systems that communicate with each other to enable the exchange of goods, services, and/or content. In some implementations, the exchange service provider could be a provider of items, and in some such implementations, the provider device 106 and the exchange platform 110 can be integrated. Alternatively, the exchange service provider can be an entity different from the provider, such that the provider device 106 and the exchange platform 110 can be separate, as shown in FIG. 1.

A provider uses an application 106-A executing on a provider device 106 to communicate with the exchange platform 110 to, for example, create or manage listings of items of provider on the exchange platform 110 and/or perform other appropriate tasks related to the exchange platform 110 (e.g., transfer an amount to the provider based on items obtained by users). The application 106-A can transmit data to, and receive data from, the exchange platform 110 over the network 104. The application 106-A can be implemented as a native application developed for a particular platform or a particular device, a web browser that provides a web interface, or another appropriate type of application. The application 106-A can present and detect user interactions (e.g., user's touch, mouse clicks, etc.) with various interfaces that enable, for example, the provider to create and manage listings of the provider's items on the exchange platform 110.

A user of a user device 102 can use an application 102-A to communicate with the exchange platform 110 to, for example, view listings of items, search for items, obtain items, and/or perform other appropriate tasks related to the exchange platform 110 (e.g., inputting payment or other identifying credentials, managing orders for items, etc.). The application 102-A can transmit data to, and receive data from, the exchange platform 110 over the network 104. The application 102-A can be implemented as a native application developed for a particular platform or a particular device, a web browser that provides a web interface, or another appropriate type of application. The application 102-A can present and detect user interactions (e.g., user's touch, mouse clicks, etc.) with various interfaces that enable, for example, the user to view listings of items, search for items, obtain items, and/or perform other appropriate tasks related to the exchange platform 110.

The exchange platform 110 includes one or more front-end servers 112 and one or more back-end servers 114. For ease of explanation, the following description assumes that the exchange platform 110 is implemented with multiple front-end servers 112 and multiple back-end servers 114.

The front-end servers 112 can transmit data to, and receive data from, user devices 102 and provider devices 106, over the network 104. For example, the front-end servers 112 can provide to, applications 102-A and 106-A executing on user devices 102 and provider devices 106, respectively, interfaces and/or data for presentation within the interfaces. The front-end servers 112 can also receive data specifying user interactions (e.g., data representing user clicks, time spent browsing different pages, keyboard entry, etc.) with the interfaces provided by the front-end servers 112 to user devices 102 and provider devices 106. The front-end servers 112 can update the interfaces, provide new interfaces, and/or update the data presented by the interfaces presented in applications 102-A and 106-A, respectively, based on user/provider interactions with user devices 102 and provider devices 106.

The front-end servers 112 can also communicate with the back-end servers 114. For example, the front-end servers 112 can identify data to be processed by the back-end servers 114, e.g., data specifying information necessary to create listings requested by a provider 106, data specifying the quantity of a given item that a user of user device 102 is requesting to obtain, etc. The front-end servers 112 can also receive, from the back-end servers 114, data for a particular user of a user device 102 or data for a particular provider of a provider device 106, and transmit the data to the appropriate user device 102 or provider device 106 over the network 104.

The back-end servers 114 can include multiple sub-components. In some implementations, and as shown in FIG. 1, the back-end server 114 can include the following sub-components: an item engine 116, a search engine 118, and a ranking engine 120. As used in this specification, the term "engine" refers to hardware, e.g., one or more data processing apparatuses, which execute software and/or programming instructions, to perform a set of tasks/operations. Although FIG. 1 depicts these three engines, the operations of these engines as described in this specification may be performed, wholly or in part, by one or more other engines. In other words, some implementations may include more than the three engines depicted in FIG. 1 to perform the operations described in this specification. Alternatively, some implementations may include fewer engines to perform the operations described in this specification. Further still, even if an implementation includes the same three engines depicted in FIG. 1, the operations performed by one of these engines, as described in this specification, may be performed by one or more of the other engines.

The item engine 116 manages the creation and modification of listings of items, as requested by a provider via application 106-A on a provider device 106. The item engine 116 can receive, from the front end-servers 112, data specifying a description of an item for a listing initiated by a provider. Based on this description, the item engine 116 can create the listing within the exchange platform 110. The description of the item can include, for example, one or more of a name for the item, a brief description of the item, a quantity of the item, an amount required to obtain the particular item, an amount required to deliver the item to a destination, a fulfillment time for the item to arrive at the destination, and one or more images of the item. The item engine 116 can use some or all of this information to create a listing for an item on the exchange platform 110. The item engine 116 can store the data for the listing, including the received information and user interactions with the listing for the item (e.g., clicks, add-to-favorite, add-to-cart, time spent viewing a particular listing, etc.), in an item data storage device 124. The item data storage device 124 can include one or more databases (or other appropriate data storage structures) stored in one or more non-transitory data storage media (e.g., hard drive(s), flash memory, etc.).

The item engine 116 can also receive, from the front end-servers 112, data specifying features of an item listing that a provider 106 may want to modify. For example, provider 106, through application 106-A, may seek to modify one or more features of the provider's item listed on the exchange platform 110. The modified features are communicated from the application 106-A to front-end server 112 over network 104. The item engine 116 in turn receives from the front end-servers 112, data specifying features of the item listing that the provider 106 wants to modify. The features to be modified can include, for example, the quantity of available items and the monetary amount required to obtain the item. The item engine 116 can use the data about the modified features to modify the listing for the items on the exchange platform 110. The item engine 116 can then use the modified features to update the item's features stored in the item data storage device 124.

The search engine 118 manages retrieval of listings of items, as requested by a user via application 102-A on a user device 102. The search engine 118 can receive from the front-end servers 112, data specifying a user's request to search for items (i.e., a search query), and generate listings of items that are responsive to the user's request/query. If a user searches for an item or a type of item on the exchange platform, the user inputs a search query into a search bar of the exchange platform's interface (e.g., website) displayed within application 102-A. The user's search query is received by front-end servers 112, which in turn sends the search query to the search engine 118. The search engine 118 uses the data specified in the search query to identify the item listings stored in the item data storage device 124 in response to the search query. The search engine 118 communicates the identified listing(s) to the front-end servers 112, which in turn provides a particular listing or a summary of listings for presentation on the application 102-A. If a summary of listings is presented to the user in application 102-A, the user can select a link for one listing from among the summary of listings. The user's selection of the link is received by the front-end server 112, which interprets the user's selection as a request for data about the particular listing. The front-end servers 112 request search engine 118 to provide data about the particular listing, which the search engine 118 obtains from the item data storage device 124. The search engine 118 responds to the front-end servers 112 with the obtained data, which is then provided by the front-end servers 112 to the application 102-A in the form of a page showing a listing for the item. The page can be a content page in a native application, or a web page in a web browser.

If a summary of listings, i.e., a plurality of items, is presented to the user in application 102-A (as described in the preceding paragraphs), the ranking engine 120 can rank the plurality of items in descending order of relevance or responsiveness to the search query. In some implementations, the ranking engine 120 includes an attribute-based ranker 122. The attribute-based ranker 122 identifies a descriptive set of attributes (such as its color, texture, material, and shape) for each of the plurality of items and determines the attributes to which the user shows an interest or preference (e.g., as determined by a machine learning model trained to discern preferred attributes for a user), forming an interpretable user preference profile that is used to rank the plurality of items in real-time (e.g., in the same web/browsing/shopping session). In some implementations, an affinity score (which can be represented, e.g., using a Beta distribution) is computed for each attribute. The shape parameters of the Beta distribution (e.g., $\alpha_{atr_h}$, $\beta_{atr_h}$) corresponding to each attribute are stored in the attribute data storage device 128. The attribute data storage device 128 can include one or more databases (or other appropriate data storage structures) stored in one or more non-transitory data storage media (e.g., hard drive(s), flash memory, etc.).

In some implementations, the attribute-based ranker 122 is a stand-alone ranker, i.e., the ranking engine 120 includes only the attribute-based ranker 122. In some implementations, the attribute-based ranker 122 can work in combination with a conventional two-stage ranker, i.e., the ranking engine 120 includes the attribute-based ranker 122 and the conventional two-stage ranker (not shown in FIG. 1). In a conventional two-stage ranker, the first stage (commonly referred to as candidate set selection) narrows a large number of items (which can be on the order of millions, or hundreds of millions) from a product catalog down to an initial set of relevant items (e.g., the top hundred items); and the second stage then ranks the initial set of relevant items (e.g., the top hundred items) to optimize for a business metric (specific user actions such as click, purchase, etc.). In order to maximize prediction accuracy, the conventional two-stage ranker can be implemented as a machine learning model that is often trained with billions of historical data points that may span over the course of months or years. Given the volume of data and time required to train a two-stage ranker, one of ordinary skill in the art will appreciate that such conventional two-stage ranker cannot achieve customized rankings that are more attuned to a user's changing preference within a single shopping/web session.

In implementations where the ranking engine is implemented with only an attribute-based ranker 122, this attribute-based ranker 122 learns the user's preferences for particular types of attributes (e.g., color, material, etc.) during a single web session and provides a ranked listing of items that include the user's preferred attributes. As one skilled in the art will appreciate, the ranked list of items is generally provided in descending order, and the item listings that are more responsive/relevant to a particular search query are listed toward the top of the ranked list, and are followed by other item listings that are less responsive/relevant to the search query. Additional details relating to the structure and operation of the ranking engine 120, and the attribute-based ranker 122 in particular, are described below with reference to FIGS. 2-6.

Alternatively, in implementations where a two-stage ranker is implemented in conjunction with the attribute-based ranker 122, the two-stage ranker generates an initial ranked listing of items that are responsive to a search query, and the attribute-based ranker 122 then re-ranks this ranked listing based on the user's preferred attributes as determined based on user interactions, e.g., click, add-to-chart, purchase, or just browse, during a single session.

The ranking engine 120 thus provides a ranked list of items that are responsive/relevant to the search query, and the front-end servers 112 in turn provide a search results page including the ranked listing of items.

A user can view and/or interact with (e.g., click, request to obtain) item listings on the search results page. In more detail, when a user views a listing for an item on the exchange platform displayed on the application 102-A, the user may decide to purchase the item. The user may select a button (or other appropriate user interface element) on the interface presented on application 102-A, which may result in the front-end servers 112 providing a different user interface to the user where the user can enter pertinent details (e.g., quantity of the item, the destination address, payment information) to begin the fulfillment process for obtaining the item. Upon submitting this information (e.g., by clicking a submit button on the user interface), the details entered by the user along with features of the item that the user wants are received by the front-end servers 112 and passed to the item engine 116. The item engine 116 evaluates whether the received data is valid (e.g., whether the quantity of the item requested by the user is the same or less than the available quantity of the item, whether the shipping address is correct, whether the payment information is correct, etc.).

If the data received from the user is invalid, the item engine 116 sends a message to the front-end servers indicating that the request is denied along with a reason explaining why the request was denied (e.g., payment credential was not approved or has an invalid shipping address, item is out of stock, etc.). The front-end servers 112 can provide a new user interface for presentation in application 102-A, in which the user is notified that the user's request was unsuccessful.

If, however, the data received from the user is valid, the item engine 116 processes the user-provided information (e.g., begins the order fulfillment process, charges the provided payment credential) and sends a message, including the received user data, to the appropriate provider (i.e., the provider of the item that the user desires to obtain) to begin the fulfillment process. The item engine 116 may store purchase information about the item (e.g., an identifier of the user purchasing the item, the quantity of the item requested and to-be provided, the amount provided for the item, the date of the order request) in a purchase data storage device 126. The purchase data storage device 126 can include one or more databases (or other appropriate data storage structures) stored in one or more non-transitory data storage media (e.g., hard drive(s), flash memory, etc.).

Subsequently, the item engine 116 can send a message to the front-end servers 112, indicating that fulfillment processing has begun. Upon receiving this message from the item engine 116, the front-end servers 112 can provide a new user interface for presentation in application 102-A, in which the user is notified that the user's request was successful and that the order processing has begun.

Additional structural and operational details of the ranking engine 120, and in particular the attribute-based ranker 122, and how it aids in fine-tuning the item listings provided to the user based on user interactions and preferences discerned during a single web browsing session, are described below with reference to FIG. 2.

Figure 2:
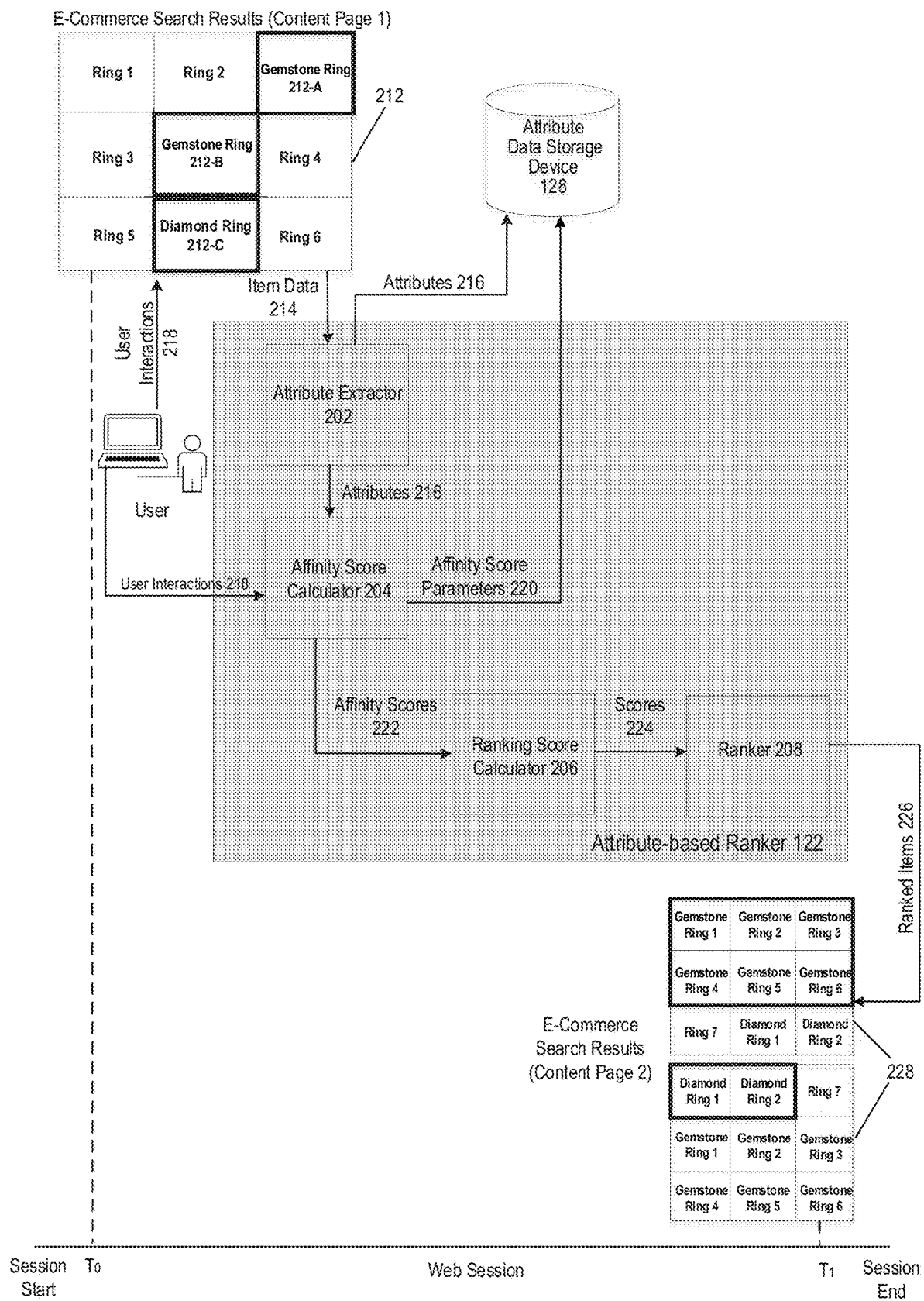
FIG. 2 is a block diagram that illustrates an example attribute-based ranker for ranking items based on user interactions within the same web session.

FIG. 2 is a block diagram that illustrates an example attribute-based ranker for ranking items based on user interactions within a single web browsing/shopping session occurring on an exchange platform, e.g., exchange platform 110 of FIG. 1. A web/shopping session is a sequence of actions (e.g., search, click, add-to-cart, view, etc.) that the user performs while engaging with the exchange platform 110 (as shown in FIG. 1). The web session ends when the user leaves the exchange platform 110 with a purchase or abandons the web session, e.g., after a predefined duration of inactivity (e.g., 30 minutes).

As shown in FIG. 2, the attribute-based ranker 122 includes multiple sub-components, including an attribute extractor 202, an affinity score calculator 204, a ranking score calculator 206, and a ranker 208. Each of these sub-components includes software and/or programming instructions that are executed by a data processing apparatus, which upon execution perform a set of tasks or operations. The operations performed upon the execution of instructions associated with each of these sub-components of the attribute-based ranker 122 are described below.

During a web/shopping session, a user of a user device 102, while viewing a web interface for the exchange platform 110 within the application 102-A, submits a search query (e.g., "ring"), and the exchange platform 110 in turn provides a first content page 212 listing a plurality of items (e.g., a plurality of rings) that are responsive to the search query.

Item data 214 of the plurality of items is provided to the attribute extractor 202. For example, item data 214 can be retrieved from the item data storage device 124 (as shown in FIG. 1) by the search engine 118 and provided to attribute extractor 202. A set of attributes 216 (such as its color, texture, material, and shape) is extracted from each item by the attribute extractor 202. The extracted attributes 216 are stored in the attribute data storage device 128. The attribute extractor 202 identifies the items listed on the first content page 212 and determines, using the item data 214 corresponding to these items, as stored in the item data storage device 124, the set of attributes 216 corresponding to these items. In an embodiment, the set of attributes 216 can be extracted from these items by data and image processing. This processing can include processing images of these items to determine shape, color, and texture of the items. In an embodiment, this processing can be performed in real-time when the search results are provided to the user. In another embodiment, this processing can be performed ahead of time and before the search results are provided to the user.

An attribute is a basic unit (e.g., size, color) that describes a characteristic of an item. In some implementations, the attributes are determined by taxonomists based on the item category, while the value of the attributes (e.g., large, green) are provided by the providers, or inferred by machine-learned classifiers. Thus, each item $x_i$ is represented as a composition of its attributes, with $H_{x_i}$ denoting the total number of attributes associated with $x_i$, then $$x_i = \{atr_1, atr_2, \ldots, atr_{H_{x_i}}\}.$$

The user interacts with one or more items on the first content page 212. For example, user A clicks on two gemstone rings 212-A, 212-B, while user B adds a diamond ring 212-C to the shopping cart. The attributes of the clicked gemstone rings 212-A, 212-B are "Crystal", "Gemstone", "Ruby", and "Rose Gold", while the add-to-cart diamond ring has the attributes "Diamond", "Engagement", "Oval-Cut" and "14 k Gold". The interactions, including click, add-to-cart, purchase, are referred to as positive interactions, while the interactions, e.g., browse, are referred to as negative interactions or neutral interactions. The items that receive positive interactions, e.g., two gemstone rings 212-A, 212-B, a diamond ring 212-C, are referred to as engaged items. The attributes of the engaged items, e.g., "Crystal", "Gemstone", "Ruby", "Rose Gold", "Diamond", "Engagement", "Oval-Cut" and "14 k Gold", are referred to as engaged attributes.

Different items can have different attributes and different corresponding values. In another example, FIG. 3 illustrates attributes of example items related to a wedding. As shown in FIG. 3, the column "Query" shows different queries submitted at different times (as indicated by timestamps 0, 1-4, 5-9, 10-11, 12-15, 16-22, 23, and 24). The column "Query Taxonomy" shows the item categories corresponding to each query. The column "User Interaction" identifies the user interactions with search results, i.e., items listed on a content page. The column "Engaged Attributes" shows attributes of engaged items that receive positive user interactions. For example, "Prime Color" indicates an attribute, while "White" indicates a value of the attribute. The notations "Prime Color: White" and "Prime Color: Blue" represent attribute-value pairs. For purposes of this description, each unique attribute-value pair is considered as a different attribute.

In some implementations, a multi-armed bandit (MAB) is used to represent the different attributes, with each arm of the MAB representing one attribute. For example, one arm of MAB represents "Color: White", one arm of MAB represents "Occasion: Wedding", one arm of MAB represents "Holiday: Christmas", one arm of MAB represents "Material: Diamond", one arm of MAB represents "Size: Large", one arm of MAB represents "Shape: Oval", etc. The MAB is trained with user interactions 218 over time within the same web session, and learns which attributes the user is interested in.

Referring back to FIG. 2, user interactions 218 and the extracted attributes 216 are provided to affinity score calculator 204. The affinity score $\theta_{atr_h}$ of an attribute denotes a probability that the user is interested in this attribute. If an attribute receives a positive user interaction (i.e., the corresponding item including this attribute receives a positive user interaction), then the user is expected to be interested in this attribute. If an attribute receives neutral or no user interactions (i.e., the corresponding item including this attribute receives neutral or no user interactions), then the user is not expected to be interested in this attribute. In one implementation, the affinity score of an attribute can be calculated with a Beta distribution, which is expressed in equation (1) below:

$$\theta_{atr_h} \sim Beta(\alpha_{atr_h}, \beta_{atr_h}) \quad (1)$$

where, $\alpha_{atr_h}$ and $\beta_{atr_h}$ are two parameters of the Beta distribution.

A web session is defined as $S=\{[Q_t, I_t, A_t]\}_{t=1}^{T}$, which is a sequence of T user interactions. The session starts at t=1 and ends at T with a purchase (or becomes inactive). At each time step, item list $I_t \in R^{M \times 1}$ contains M candidate items to be ranked for query $Q_t$, and then how the user engages with the list of items is represented by $A_t$:

$$A_t(x_i) = \begin{cases} 0, & \text{no action on } x_i \\ 1, & x_i \text{ is purchased} \\ 2, & x_i \text{ is added to cart} \\ 3, & x_i \text{ is clicked} \end{cases}, \forall x_i \in I_t$$

Let $\mathcal{U}$ denote the set of attributes associated with items receiving positive interactions (i.e., click, add-to-cart, purchase), and $\mathcal{V}$ denote a union of all attributes that exist in $x_i \in I_t$:

$$\mathcal{U} = \cup \{atr_h : \forall atr_h \in x_i \text{ if } A_t(x_i) \neq 0, \forall x_i \in I_t\}$$

$$\mathcal{V} = \cup \{atr_h : \forall atr_h \in x_i, \forall x_i \in I_t\}$$

For a given $a_{trh}$, let $\dot{\mathcal{Y}}_{t,atr_h}$ and $\ddot{\mathcal{Z}}_{t,atr_h}$ denote the set of items associated with positive user interaction and neutral or no positive user interactions, respectively.

$$\dot{\mathcal{Y}}_{t,atr_h} = \{x_i \in I_t : atr_h \in x_i \text{ and } atr_h \in \mathcal{U}\}$$

$$\ddot{\mathcal{Z}}_{t,atr_h} = \{x_i \in I_t : atr_h \in x_i \text{ and } atr_h \in \mathcal{V} \setminus \mathcal{U}\}$$

Then two parameters of the Beta distribution are calculated using equation (2) below:

$$\alpha_{atr_h} += \sum_{\dot{\mathcal{Y}}_{t,atr_h}} \delta_{A_t(x_i)}(1 - e^{-|\mathcal{U}_t|_0}), \forall atr_h \in \mathcal{U}_t \quad (2)$$

$$\beta_{atr_h} += \sum_{\ddot{\mathcal{Z}}_{t,atr_h}} \delta_{A_t(x_i)}(1 - e^{-\gamma|\mathcal{V}_t|\mathcal{U}_t|_0}), \forall atr_h \in \mathcal{V}_t \setminus \mathcal{U}_t$$

where, $\delta_{A_t(x_i)}$ denotes increments on each attribute based on user interactions, $\gamma$ controls intensity on attributes that receive positive user interactions, $|\bullet|_0$ denotes the cardinality operator.

Figure 4:
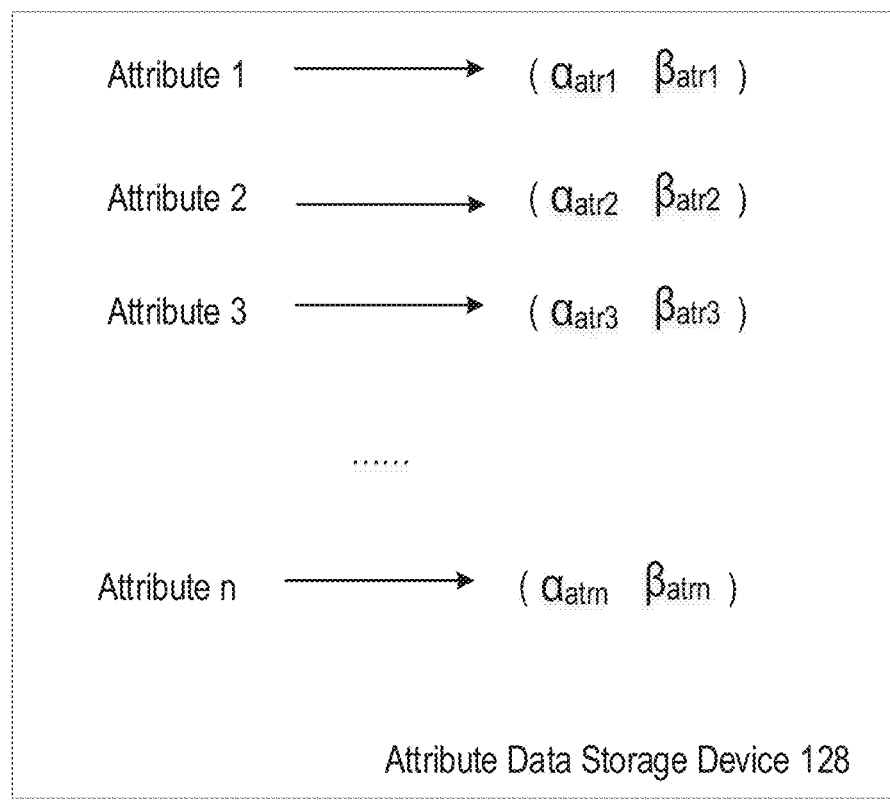
FIG. 4 is a block diagram that illustrates an example attribute data storage device used for storing affinity score parameters of each attribute.

The affinity score parameters 220, e.g., $\alpha_{atrh}$ and $\beta_{atrh}$, are stored in the attribute data storage device 128. Each row of the attribute data storage device 128 denotes a Beta distribution parameter set ($\alpha_{atrh}$, $\beta_{atrh}$) for a given attribute. As shown in FIG. 4, a distribution parameter set ($\alpha_{atrh}$, $\beta_{atrh}$) is calculated for each attribute, and is stored in a row of the attribute data storage device 128. The distribution parameter set is stored for each attribute in the sequence from Attribute 1 to Attribute n (where n is the total number of attributes).

The affinity score $\theta_{atrh}$ 222 of each attribute is provided to the ranking score calculator 206. Each item $$x_i = \{atr_h\}_{h=1}^{H_{x_i}}$$

is a composition of attributes 216. Each item is scored with equation (3) below:

$$score(x_i) = \sum_{atr_h \in x_i} g(\theta_{atr_h}) \quad (3)$$

where, $$g(\theta_{atr_h}) = \frac{1}{rank(\theta_{atr_h})}$$

is a harmonic function of the index (i.e., the ranking position of $\theta_{atrh}$ 222) that $\theta_{atrh}$ is ranked among $$\{\theta_{atr_h}\}_{h=1}^{H_{x_i}}.$$

A larger score($x_i$) indicates higher satisfaction/interest of a user with item x; based on the probability of the user's interest in attributes $$\{atr_h\}_{h=1}^{H_{x_i}}.$$

All the scores 224 are provided to the ranker 208, and the items are ranked based on scores $[score(x_i)|x_i \in I_t$ 224. In an embodiment, the items are ranked in descending order of scores 224.

The ranked items 226 are output from the ranker 208, and shown on a subsequent content page, e.g., a second content page 228. In some implementations, the second content page 228 is provided, e.g., when the user clicks a "Next Page" link on the first content page 212, to see additional listings for the previously-submitted search query. The second content page 228 is populated with the ranked items 226 output by the ranker 208 of the attribute-based ranker 122.

Notably, despite the two users (user A and user B submitting the same search query, and receiving the same first content page 212), the second content page 228 presented to each user may provide different ranked lists of items (e.g., the same list of items, but ranked differently; or even different lists of items ranked by the attribute-based ranker 122) that are based on the different interactions of each user with the items (and their corresponding attributes) on the first content page 212. For example, because user A clicks on two gemstone rings 212-A, 212-B on the first content page 212, gemstone rings rank higher than diamond rings and other rings on the second content page 228 presented to user A. On the other hand, user B interacted with the first content page 212 by adding a diamond ring 212-C to the shopping cart, and as a result, diamond rings rank higher than gemstone rings and the other rings on the second content page 228. In both examples, the first content page 212 and the second content page 228 are presented to the users within the same respective web session, with the items shown on the second content page 228 being ranked based on user interactions with the items shown on the first content page 212.

Figure 5:
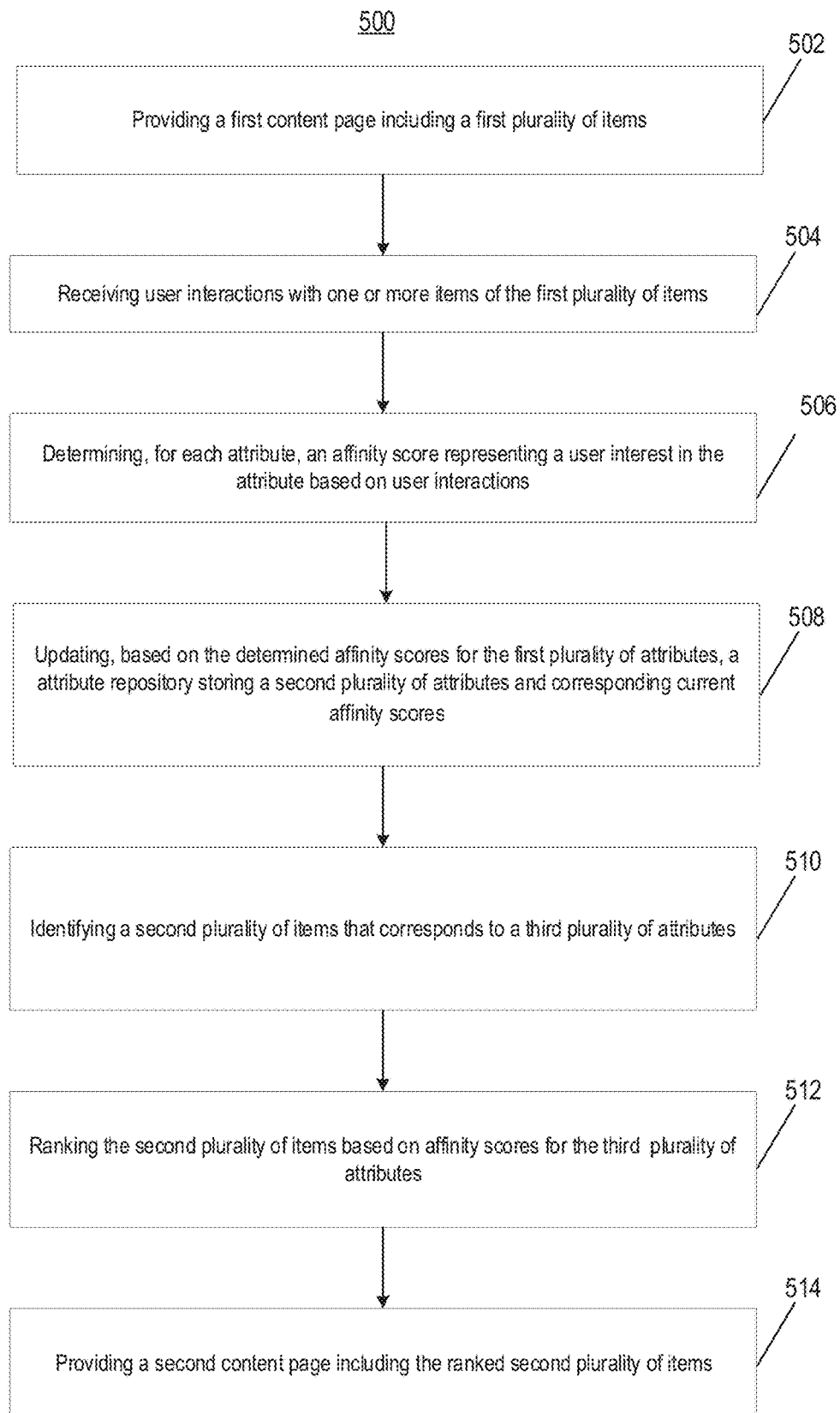
FIG. 5 is a flow diagram of an example process for ranking items based on user interactions within the same web session.

FIG. 5 is a flow diagram of an example process 500 for ranking items based on user interactions within the same web session. Operations of the process 500 are described below for purposes of illustration only. The operations of the process 500 can be performed by any appropriate device or system, e.g., any appropriate data processing apparatus (also referred to as "computing device" with reference to FIG. 6), which may include a device or system that is not a part of the exchange platform (e.g., a proxy server through which all traffic to and from the exchange platform flows). Operations of the process 500 can also be implemented as instructions stored on a non-transitory computer-readable medium. Execution of the instructions causes one or more data processing apparatuses to perform operations of the process 500.

At step 502, the exchange platform 110 provides a first content page 212 for display on a user device 102, where the first content page 212 includes a first plurality of items. As described with reference to FIGS. 1-4, each item has its own set of attributes, such that the first plurality of items corresponds to a first plurality of attributes.

For example, a user inputs a search query "ring" into a search bar of the exchange platform 110 (as shown in FIG. 1) and retrieves a first content page 212 (as shown in FIG. 2) listing a plurality of rings. Each ring includes common attributes such as color, size, shape, material, etc., and may also include customized attributes such as craft type, occasion, wedding theme, etc. Example attributes can be "Crystal", "Gemstone", "Ruby", "Rose Gold", "Diamond", "Engagement", "Oval-Cut", and "14 k Gold", etc.

At step 504, the exchange platform 110 receives data representing user interactions with one or more items of the first plurality of items. In some implementations, the user interacts with one or more items of the first plurality of items as provided on the first content page 212 displayed on the user device 102. The data representing the user interactions with particular item(s) among the first plurality of items are recorded (e.g., by a client side script). Examples of such user interactions include clicks, purchases, among other interactions (as described with reference to FIGS. 1 and 2). The user device 102 sends, and the exchange platform 110 receives, the data representing the user interactions with the one or more items included on the first content page 212.

For example, during a user's session, the user clicks a gemstone ring, adds a diamond ring to the shopping cart, or purchases a golden ring. The data representing each of these interactions are then sent by the user device 102, and received by the exchange platform 110.

At step 506, the exchange platform 110 determines an affinity score for each attribute based on user interactions. As described above with reference to FIGS. 1 and 2, the affinity score represents a user interest in a particular attribute. In some implementations, the affinity score of an attribute can be calculated with a Beta distribution (as described with reference to FIGS. 1 and 2). In some implementations, positive user interactions, e.g., click, add-to-cart, or purchase, can be assigned the same weight. Alternatively, click, add-to-cart, or purchase can be assigned different weights. For example, the weight of click can be 0.1, the weight of add-to-cart can be 0.2, and the weight of purchase can be 0.3. Assigning different weights for different user interactions rests on the premise that certain interactions (e.g., purchase) indicate a higher likelihood of user interest in an item (and its attributes) relative to other interactions (e.g., click).

At step 508, the exchange platform 110 updates, based on the determined affinity scores for the first plurality of attributes, an attribute repository storing a second plurality of attributes and corresponding current affinity scores. The attribute repository can be the attribute data storage device 128, which can be configured to store data identifying attributes and the current affinity score for each of those attributes. In some implementations, when the attribute affinity scores for certain attributes are computed (e.g., the affinity scores computed for the first plurality of attributes, as in step 506), those computed attribute affinity scores are used to update the current affinity scores for those same attributes as stored in the attribute repository. For example, updating an attribute's affinity scores can include summing the existing/current affinity score with the newly-computed affinity score. It will be appreciated that the attribute repository includes a complete listing of attributes (i.e., the second plurality of attributes), and thus, the second plurality of attributes encompasses the first plurality of attributes.

At step 510, the exchange platform 110 identifies a second plurality of items. In some implementations, the search engine 118 of the exchange platform 110 uses a submitted query to identify items that are responsive/relevant to the search query (as described with reference to FIG. 1). A subset of the total search results can be initially provided, e.g., on the first content page 212. When the user clicks "Next Page" in the application 102-A of the user device 102 (as shown in FIG. 1) to retrieve additional search results, an additional set of search results that were previously obtained by the search engine 118 are then identified. Alternatively, instead of requesting additional search results for a previously-submitted search query, the user of user device 102 can submit a new query (e.g., "ruby ring") and the search engine 118 can then retrieve new search results that are responsive/relevant to this new query.

In either case, the additional search results that are identified can be referred to as the second plurality of items. As with the first plurality of items, the second plurality of items corresponds to a plurality of attributes (referred to herein as a third plurality of attributes). A subset of the third plurality of attributes can overlap with a subset of attributes in the first plurality of attributes. For example, the second plurality of items may have attributes "Crystal", "Gemstone", "Ruby", "Rose Gold", which are the same as the attributes of the first plurality of items.

At step 512, the exchange platform 110 ranks the second plurality of items. In some implementations, the exchange platform's ranking engine 120 can include a conventional two-stage ranker together with the attribute-based ranker 122. The conventional two-stage ranker can initially rank the second plurality of items, and the attribute-based ranker 122 can then re-rank the ranked second plurality of items. Alternatively, the ranking engine 120 of the exchange platform 110 can include only the attribute-based ranker 122 (i.e., it does not include the two-stage ranker); in this case, the attribute-based ranker 122 is the only ranker that ranks the second plurality of items.

In either implementation, the attribute-based ranker 122 performs its ranking operations based on current affinity scores corresponding to the third plurality of attributes stored in the attribute repository. The affinity scores are used to calculate a ranking score for each item in the second plurality of items. In some implementations, the ranking scores are computed using equation (3), as described above. The second plurality of items is ranked based on the ranking scores, as described above with reference to FIGS. 1 and 2.

In some implementations, the ranking of the second plurality of items includes sampling (e.g., randomly sampling) a subset of the third plurality of attributes and identifying the attribute affinity scores corresponding to this subset of attributes. The ranking scores are then computed using the current affinity scores for this subset of attributes in the third plurality of attributes (and the ranking is performed in the same manner as described above with reference to FIGS. 1 and 2).

At step 514, the exchange platform 110 provides a second content page 228 including the ranked third plurality of items, for display on the user device 102 (and within the application 102-A). As described and depicted in FIG. 2, the additional search results or the new search results are ranked and listed on the second content page 228 (as shown in FIG. 2). For example, a plurality of new rings is retrieved and ranked based on user interactions with one or more rings on the first content page 212 (as shown in FIG. 2).

Notably, the example process 500, as described above, is performed within the same user web session (e.g., a shopping session). The example process 500 is performed iteratively until the session ends. In the same session, the attribute-based ranker 122 learns the user's affinity or interest in particular attributes based on user interactions, e.g., click, add-to-chart, purchase, and iteratively ranks items provided for display to the user as informed by the user's interactions and computed affinity scores.

Figure 6:
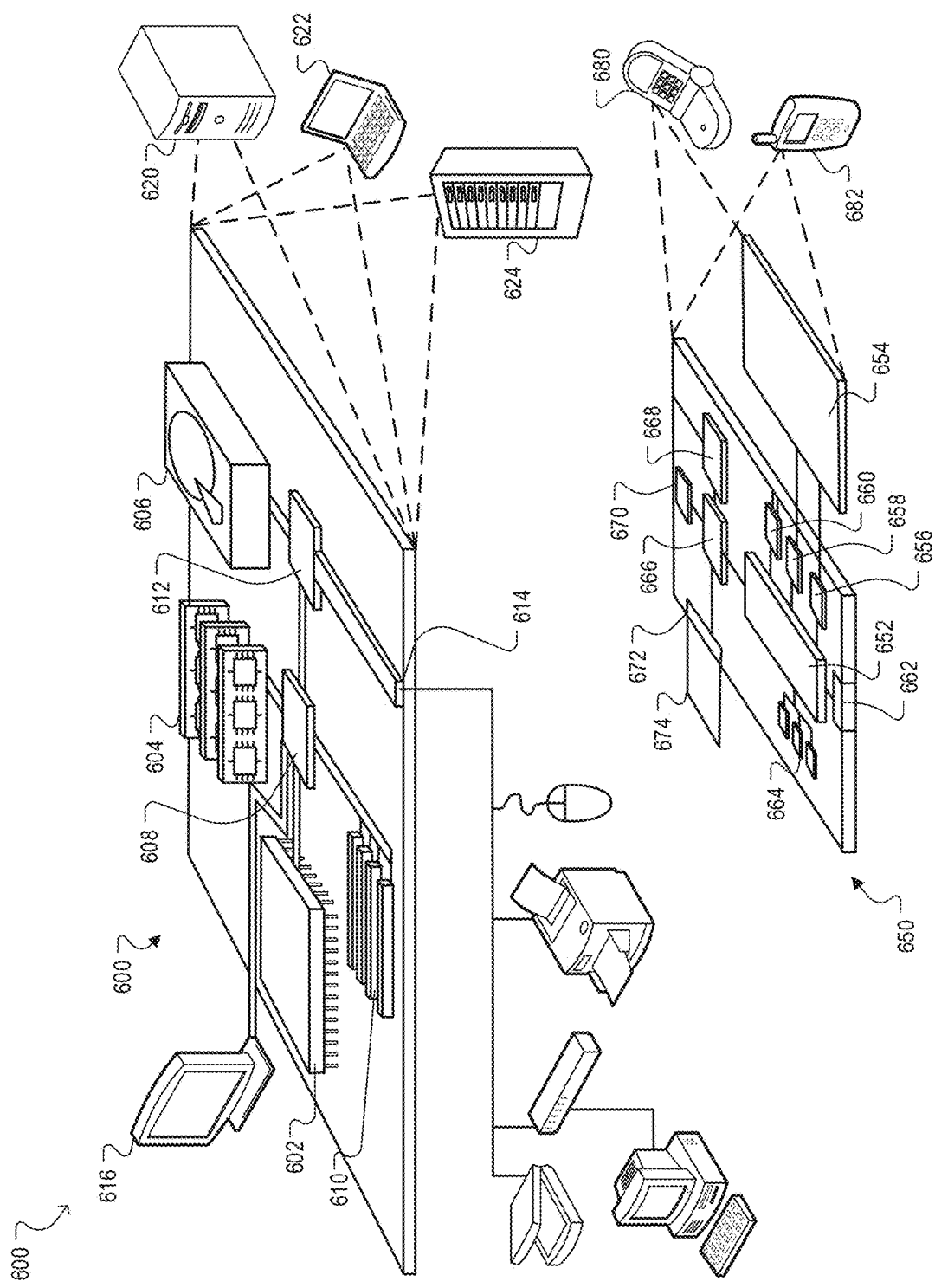
FIG. 6 is a block diagram of computing devices that may be used to implement the systems and methods described in this disclosure.

FIG. 6 is a block diagram of computing devices 600, 650 that may be used to implement the systems and methods described in this document, either as a client or as a server or plurality of servers, or in cloud computing environments. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low-speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a hard disk device, an optical disk device, a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a Microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using Bluetooth, WiFi, or other such transceivers (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.), and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or another similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications, or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus, and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication, such as, a communication network. Examples of communication networks include a local area network ("LAN"), a wide area network ("WAN"), and the Internet.

The computing system can include clients and servers. A client and server are generally remote from each other and typically interact through a communication network. The relationship between client and server arises by virtue of computer programs running on the respective computers and having a client-server relationship with each other.

As used in this specification, the term "module" is intended to include, but is not limited to, one or more computers configured to execute one or more software programs that include program code that causes a processing unit(s)/device(s) of the computer to execute one or more functions. The term "computer" is intended to include any data processing or computing devices/systems, such as a desktop computer, a laptop computer, a mainframe computer, a personal digital assistant, a server, a handheld device, a smartphone, a tablet computer, an electronic reader, or any other electronic device able to process data.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

The invention claimed is:

1. A computer implemented method to improve ranking performance of items during a user web session, comprising:
providing, by a processor and during the user web session, a first content page for display on a client device, wherein the first content page includes a first plurality of items;
receiving, by the processor and during the user web session, a set of user interactions with one or more of the first plurality of items;
generating, using a first machine learning model operating on data representing the first plurality of items, a first set of attributes for the first plurality of items;
training, during the user web session, a second machine learning model to generate affinity scores, wherein training the second machine learning model comprises:
training a multi-armed bandit (MAB) using the set of user interactions from the user web session to learn attributes of interest, wherein each arm of the MAB represents one attribute of the first set of attributes, and wherein training the MAB comprises adjusting, using (i) a set of training data including the set of user interactions from the user web session and (ii) a corresponding set of labels representing positive or non-positive user interactions, a first score associated with a first attribute of the first set of attributes;
determining, using (i) the second machine learning model, (ii) the set of user interactions, and (iii) the first set of attributes for the first plurality of items, an affinity score representing a user interest in each attribute of the first set of attributes;
in response to a request by a user of the user web session for additional items during the user web session, identifying a second plurality of items;
providing, to the first machine learning model, data representing the second plurality of items;
generating, using the first machine learning model operating on the data representing the second plurality of items, a second set of attributes for the second plurality of items;
generating, using (i) the second set of attributes and (ii) the affinity scores corresponding to the first set of attributes, a set of ranking scores for the second plurality of items;
ranking, during the user web session and using the set of ranking scores for the second plurality of items, the second plurality of items; and
providing, during the user web session, a second content page for display on the client device, wherein the second content page includes the ranked second plurality of items.

2. The computer implemented method of claim 1, wherein determining the affinity score representing the user interest comprises determining a Beta distribution for each attribute in the first set of attributes.

3. The computer implemented method of claim 2, wherein one parameter of the Beta distribution is associated with a subset of attributes in the first set of attributes that receives the set of user interactions, and another parameter of the Beta distribution is associated with the remaining attributes in the first set of attributes that receive no positive user interactions.

4. The computer implemented method of claim 1, wherein the set of user interactions includes one or more of: browsing the one or more items of the first plurality of items, clicking the one or more items of the first plurality of items, adding the one or more items of the first plurality of items to a shopping cart, or purchasing the one or more of the first plurality of items.

5. The computer implemented method of claim 4, wherein determining the affinity score representing the user interest comprises assigning a different weight to each of the clicking the one or more of the first plurality of items, the adding the one or more of the first plurality of items to a shopping cart, and the purchasing the one or more of the first plurality of items.

6. The computer implemented method of claim 4, wherein determining the affinity score representing the user interest comprises assigning a same weight to each of the clicking the one or more of the first plurality of items, the adding the one or more of the first plurality of items to a shopping cart, and the purchasing the one or more of the first plurality of items.

7. The computer implemented method of claim 1, wherein the first set of attributes includes at least one of color, size, shape, or material.

8. The computer implemented method of claim 1, wherein the first machine learning model comprises a machine-learned classifier.

9. A system, comprising:
one or more memory devices storing instructions; and
one or more data processing apparatuses that are configured to interact with the one or more memory devices, and upon execution of the instructions, perform operations including:
providing, during a user web session, a first content page for display on a client device, wherein the first content page includes a first plurality of items;
receiving, during the user web session, a set of user interactions with one or more of the first plurality of items;
generating, using a first machine learning model operating on data representing the first plurality of items, a first set of attributes for the first plurality of items;
training, during the user web session, a second machine learning model to generate affinity scores, wherein training the second machine learning model comprises:

training a multi-armed bandit (MAB) using the set of user interactions from the user web session to learn attributes of interest, wherein each arm of the MAB represents one attribute of the first set of attributes, and wherein training the MAB comprises adjusting, using (i) a set of training data including the set of user interactions from the user web session and (ii) a corresponding set of labels representing positive or non-positive user interactions, a first score associated with a first attribute of the first set of attributes;

determining, using (i) the second machine learning model, (ii) the set of user interactions, and (iii) the first set of attributes for the first plurality of items, an affinity score representing a user interest in each attribute of the first set of attributes;

in response to a request by a user of the user web session for additional items during the user web session, identifying a second plurality of items;

providing, to the first machine learning model, data representing the second plurality of items;

generating, using the first machine learning model operating on the data representing the second plurality of items, a second set of attributes for the second plurality of items;

generating, using (i) the second set of attributes and (ii) the affinity scores corresponding to the first set of attributes, a set of ranking scores for the second plurality of items;

ranking, during the user web session and using the set of ranking scores for the second plurality of items, the second plurality of items; and providing, during the user web session, a second content page for display on the client device, wherein the second content page includes the ranked second plurality of items.

10. The system of claim 9, wherein determining the affinity score representing the user interest comprises determining a Beta distribution for each attribute in the first set of attributes.

11. The system of claim 10, wherein one parameter of the Beta distribution is associated with a subset of attributes in the first set of attributes that receives the set of user interactions, and another parameter of the Beta distribution is associated with the remaining attributes in the first set of attributes that receive neutral user interactions.

12. The system of claim 9, wherein the set of user interactions includes one or more of: browsing the one or more items of the first plurality of items, clicking the one or more items of the first plurality of items, adding the one or more items of the first plurality of items to a shopping cart, or purchasing the one or more of the first plurality of items.

13. The system of claim 12, wherein determining the affinity score representing the user interest comprises assigning a different weight to each of the clicking the one or more of the first plurality of items, the adding the one or more of the first plurality of items to a shopping cart, and the purchasing the one or more of the first plurality of items.

14. The system of claim 12, wherein determining the affinity score representing the user interest comprises assigning a same weight to each of the clicking the one or more of the first plurality of items, the adding the one or more of the first plurality of items to a shopping cart, and the purchasing the one or more of the first plurality of items.

15. The system of claim 9, wherein the first set of attributes includes at least one of color, size, shape, or material.

16. A non-transitory computer readable medium storing instructions that, when executed by one or more data processing apparatuses, cause the one or more data processing apparatuses to perform operations comprising:

providing, during a user web session, a first content page for display on a client device, wherein the first content page includes a first plurality of items;

receiving, during the user web session, a set of user interactions with one or more of the first plurality of items;

generating, using a first machine learning model operating on data representing the first plurality of items, a first set of attributes for the first plurality of items;

training, during the user web session, a second machine learning model to generate affinity scores, wherein training the second machine learning model comprises:
training a multi-armed bandit (MAB) using the set of user interactions from the user web session to learn attributes of interest, wherein each arm of the MAB represents one attribute of the first set of attributes, and wherein training the MAB comprises adjusting, using (i) a set of training data including the set of user interactions from the user web session and (ii) a corresponding set of labels representing positive or neutral user interactions, a first score associated with a first attribute of the first set of attributes;

determining, using (i) the second machine learning model, (ii) the set of user interactions, and (iii) the first set of attributes for the first plurality of items, an affinity score representing a user interest in each attribute of the first set of attributes;

in response to a request by a user of the user web session for additional items during the user web session, identifying a second plurality of items;

providing, to the first machine learning model, data representing the second plurality of items;

generating, using the first machine learning model operating on the data representing the second plurality of items, a second set of attributes for the second plurality of items;

generating, using (i) the second set of attributes and (ii) the affinity scores corresponding to the first set of attributes, a set of ranking scores for the second plurality of items;

ranking, during the user web session and using the set of ranking scores for the second plurality of items, the second plurality of items; and providing, during the user web session, a second content page for display on the client device, wherein the second content page includes the ranked second plurality of items.

17. The computer readable medium of claim 16, wherein determining the affinity score representing the user interest comprises determining a Beta distribution for each attribute in the first set of attributes, wherein one parameter of the Beta distribution is associated with a subset of attributes in the first set of attributes that receives the set of user interactions, and another parameter of the Beta distribution is associated with the remaining attributes in the first set of attributes that receive no positive user interactions.

* * * * *